United States Patent Office 3,421,565
Patented Jan. 14, 1969

3,421,565
TREAD END CEMENT FOR SYNTHETIC
TIRE TREADS
Emmett B. Reinbold, Cuyahoga Falls, Ohio, assignor to
The General Tire & Rubber Company, Akron, Ohio,
a corporation of Ohio
No Drawing. Continuation-in-part of aplication Ser. No.
277,712, May 3, 1963. This application Nov. 18, 1964,
Ser. No. 412,225
U.S. Cl. 152—330                    15 Claims
Int. Cl. C08d 9/10; C08d 13/20; B32b 25/16

ABSTRACT OF THE DISCLOSURE

This invention comprises a cement useful with tire treads. The cement comprises 100 parts by weight of an SBR-type rubbery polymer having a computed Mooney viscosity of 120 to 180, 0 to 15 parts of a hydrocarbon plasticizer oil, about 30 to 120 parts of an abrasion furnace carbon black having a basic pH and an average surface area of between 100 and 170 square meters per gram and about 65 to 125 parts of a certain condensation product melting in the range of 230° F. to 265° F. The invention also comprises a method for preparing the cement wherein, first, from 30 to 70 percent of the resinous condensation product is added in heat-softened form to the polymer (with or without plasticizer oil), second, at least a major portion of the carbon black is added and, third, the rest of the resinous condensation product is added with the aid of a suitable mutual solvent for the product and the polymer. The invention also comprises composite elastic structures, including tires specifically, which make use of the subject cement and a method for making tires using said cement.

This application is a continuation-in-part of U.S. application Ser. No. 277,712, filed May 3, 1963 by the inventor herein and now abandoned.

The present invention relates to an improved tire tread adhesive and more particularly to a high strength rubber cement which is applied to the bias-cut ends of a tire tread and to a process of making such cement. The invention further relates to new and useful methods for producing pneumatic tires utilizing such improved tread cements.

For many years, natural rubber adhesives were considered superior to most known synthetic adhesives, even for manufacture of SBR-type (butadiene-styrene) rubber tires. Synthetic rubber tire adhesives have been discovered which produce tires at least equal to those having the rubber portions adhered with natural rubber adhesives. Such synthetic adhesives are known in the art and disclosed in Canadian Patents Nos. 541,630 and 582,885.

It has now been discovered that the quality of certain tire splices is greatly improved by reducing the amount of oil or even eliminating the oil in a high Mooney diene rubbery hydrocarbon polymer adhesive composition, by adding certain critical amounts of specific types of resinous condensation products of alkines and alkylphenols such as Koresin, preferably before any carbon black is added, by employing certain types of carbon black and by adding additional amounts of the resinous condensation products after certain of the ingredients of the rubber composition, preferably including curing agents, have been incorporated into the solid rubber at certain temperatures and after such rubber composition subsequently has been cooled and then dispersed in an organic solvent.

A typical process for making a tread cement according to the invention is to add to 100 parts by weight of an SBR-type rubbery copolymer having a high computed Mooney viscosity, advantageously a Mooney of 120 to 180 and preferably a computed Mooney viscosity of 120 to 150 or 160 in a Banbury mixer, 0 to 15 parts, preferably 0 to 10 parts of a plasticizer such as, for example, a hydrocarbon plasticizer oil, at least 20 parts of an alkine-alkylphenol resin (e.g., Koresin) and 30 to 120 parts of carbon black as hereinafter described and to admix these ingredients at specific elevated temperatures. A substantial amount, preferably at least 20 parts, and even more especially at least 30 to 40 parts of the resin should be dispersed in the rubber before the carbon black is added if the cement is to have optimum quality. The amount of resin and plasticizer oil (if present) together with the abrasion furnace carbon black preferably is such that the compounded Mooney viscosity is fairly high, i.e., generally from 60 to 100 and preferably 70 to 90 (ML–4 at 212° F.). After the resulting rubber composition is cooled from the aforesaid elevated temperature, it is preferably worked in another mixing cycle, advantageously also at an elevated temperature but preferably well below (e.g., 30 to 50° F. below) the vulcanization temperature of the rubber, with the optional addition of such curatives as sulfur, antioxidants as phenyl-beta-naphthylamine, or such curatives as zinc oxide and accelerators. The resulting composition then is dissolved in a suitable resin solvent, which preferably is also a solvent for the rubber hydrocarbons, and at least 20 more parts, preferably at least 30 to 40 more parts of resin are added per 100 parts by weight of total rubber hydrocarbons. The resin preferably is dissolved separately in an organic solvent beforehand, the solvent preferably also being capable of dissolving the rubber hydrocarbons. In the tread cement formed, the total amount of tackifying resin should be from 65 to 125 parts, preferably 70 to 100 parts per 100 parts by weight of total high Mooney viscosity rubber hydrocarbons.

An object of the invention is to provide an improved tire tread cement which facilitates the production of high quality synthetic rubber tires.

Another object of the invention is to provide an improved process for preparing tread cements and tread adhesives for synthetic tire treads.

Other objects and advantages of the invention will become apparent to those skilled in the art from the following description and claims.

The cold rubber or high Mooney diene rubbery hydrocarbon polymers, useful in the tread adhesives and tread cements of the present invention, normally comprise rubbery polymers of $C_4$ to $C_8$ dienes, generally polymers of $C_4$ to $C_6$ multiolefins, advantageously polymers of $C_4$ to $C_6$ diolefins and even more especially, polymers of $C_4$ to $C_6$ conjugated diolefins, preferably with minor proportions of monoolefinic compounds, especially vinylaryl compounds such as, for example, 3,4-dichloro styrene; 3-chloro-4-methylstyrene, and the like, especially vinyl aromatic hydrocarbons such as alpha-methyl styrene or preferably styrene. Such cold rubber diene polymers are prepared by emulsion and mass free radical polymerization processes and also by ionic polymerizations including Friedel-Crafts catalysis and the alfin catalytic process. When prepared in emulsion, a redox-type system is advantageous, and temperatures below about 50° F., such as 41° F. or lower, are used. Alfin polymerization normally is conducted at room temperature with sodium alkyl-complex-ether or alcohol catalysts as described on page 8, vol. 65, Rubber Age (1949) and pages 95 to 102, I. & E. Chemistry, January, 1950. Alternative promoters include Natta or Ziegler-type catalysts.

It is known, in forming certain adhesives to add to 100 parts by weight of cold SBR-type copolymers, 30 to 50 parts of the resin 2,6-dimethylol-4-octyl phenol-formaldehyde (i.e. Amberol S.T.–137X) together with 30 to 70 parts of the HAF carbon black known as "Philblack O" and having a surface area of about 70 square meters per gram and/or equivalent HAF carbon blacks of about 80 square meters per gram (e.g. "Vulcan 3"). The particle sizes of such HAF carbon blacks are given in the Vanderbilt Handbook, Eighth Edition as being between about 74 and 98 square meters per gram.

It has been proposed to use, in a rubber tread cement, together with 100 parts by weight of a cold SBR-type copolymer, 10 to 60 parts of Koresin melting at 245° to 250° F. and about 20 up to 50 parts of oil together with 40 to 100 parts of HAF carbon black (i.e., of 70 to 80 square meters per gram surface area, supra).

Furthermore, adhesives for medical bandages are known which comprise 100 parts by weight of a semi-cold rubbery SBR-type copolymer having a Mooney viscosity of 30 to 100 with 50 to 150 parts of such tackifying resinous materials as rosin, hydrogenated rosin or esters of rosinous materials, 10 to 150 parts by weight of a plasticizer such as white mineral oil, 1 to 300 parts by weight of a filler such as clay or SRF carbon black, together with 4 parts by weight of total curing agents. Before use, the resulting composition is pre-cured at temperatures of 200° to 250° F. in the presence of added solvents, or at temperatures of about 300° F. in the absence of added solvents. The adhesive just described is not practical as a tread cement for oil-extended cold SBR-type rubber because the Mooney viscosity of the SBR-copolymer in the adhesive is unduly low, the resinous tackifying materials are not at all suitable, and the types of fillers are not correct.

It has been further proposed to adhere synthetic rubber tire treads, other than SBR rubber treads, to an SBR-type carcass using an adhesive containing Neoprene rubber (i.e., polymerized 2-chloro-butadiene-1,3 rubber) alone or admixed with a synthetic rubber other than an SBR rubber. In this case, a titanium dioxide pigment is used together with 0.5 to 10.0 parts by weight of such tackifying materials as hard cumar, rosin, coal-tar or pitch. Such rubber cements are not suitable for the adhesion of cold SBR-type copolymer treads to the carcass portion of synthetic SBR-type tires.

Partially vulcanized butyl rubber (i.e., multiolefin-isoolefin copolymers) together with 2,6-dimethylol-4-octyl phenol-formaldehyde resins have also been suggested as tire tread adhesives. However, these adhesives have not been found useful for the purposes of the invention due to the fact that butyl rubber requires different acceleration than does SBR-type rubbery copolymers. The foregoing resin is also unsatisfactory.

Rubbery copolymers of butadiene and acrylonitrile, which have been compounded with rosin or coal tar, have also been suggested as tread adhesives. However, such adhesives have been found unsatisfactory because of the inoperability of rosin or coal tar as tackifying materials in tread cements.

The rubber hydrocarbons of the adhesive composition of this invention preferably comprise rubbery polymerization products of a conjugated diolefin such as isoprene and/or preferably butadiene-1,3; preferably members of the group consisting of polybutadiene and especially copolymers of butadiene with vinylaryl compounds, such as styrene, said polymerization products having computed Mooney viscosities of 120 to 180, preferably 120 to 160. The butadiene styrene (SBR) copolymers used in the cement of the present invention generally contain 60 to 85% by weight of butadiene and 40 to 15% by weight of styrene. Also, the rubber adhesive composition of this invention may contain 0 to 30 parts, per 100 parts by weight of total rubber hydrocarbons, of elastic polybutadiene rubber with an apparent raw Mooney viscosity of about 35 to 65. Usually more than 30% of the polybutadiene rubber has the cis-1,4 structure, and there is preferably at least 60%, although 90 or 95% cis-1,4-polybutadiene is even more desirable for the purposes of the present invention. Processes for preparing suitable polybutadiene rubbers are well known in the art and such rubbers are available commercially. Some of these processes are discussed in the article on pages 361 to 377, Rubber Chemistry and Technology, vol. XXXIV, No. 2, April-June 1961, and page 643, McGraw-Hill Encyclopedia of Science & Technology, vol. XI, 1960 edition.

The adhesive composition of this invention employs an abrasion furnace carbon black having a basic pH and an average surface area of from 100 up to 170, preferably from 110 to 140 or 160, square meters per gram, the preferred pH range being from 7.5 to 10.0. Within this definition, an abrasion furnace carbon black having a basic pH such as ISAF carbon black having an average surface area of about 110 or 115 to 135 or 140 square meters per gram may be used as the sole carbon black.

Alternatively, blends of preferably minor proportions of HAF carbon blacks having particle sizes between about 74 and 98 square meters per gram together with a major proportion of SAF carbon black having a surface area of between about 140 to 160, preferably about 140 to 150 square meters per gram may be used. Also, mixtures of preferably a minor proportion of SAF carbon blacks with a major proportion and preferably at least two-thirds of ISAF carbon blacks are useful for the purposes of the present invention, as are mixtures of about 70 to 100% ISAF carbon blacks together with about up to 30% HAF carbon blacks.

The blend of carbon blacks should have an average surface area of above 100 up to 160 or 170 square meters per gram and preferably 110 to 140 square meters per gram. Blends of all three of the abrasion furnace carbon blacks just mentioned are operable and useful in accordance with the present invention as long as the average surface area of the blend is about 110 to 160 square meters per gram. It is, however, preferable to utilize either all ISAF carbon blacks having an average surface area in square meters per gram of about 115 to 140 or a major proportion of such ISAF carbon blacks together with minor proportions of HAF carbon blacks of 74 to 98 square meters per gram and the SAF carbon blacks with the surface areas hereinbefore mentioned providing the blend has an average surface area of about 110 to 150 square meters per gram.

It should be noted that although SRF carbon black has a basic pH, the surface area of SRF carbon black is only between about 15 and 20 square meters per gram (Whitby text, supra, page 400) thus rendering SRF carbon black inoperative for the purposes of the present invention. In a like manner, the furnace carbon black Statex-A, having a low surface area of about 60 to 65 square meters per gram, is also unsuitable for use in accordance with the present invention.

Further, the carbon black MAF (Medium-Abrasion-Furnace) carbon black is unsuitable for the purposes of the invention in that the surface area is too small, namely about 35 to 60 square meters per gram.

The upper limit of surface area of carbon black is also critical. Thus, the carbon black known as CC (conductive channel) carbon black is unsuitable for use in cements of the invention apparently because the surface area is two times too high, i.e., 385 to 390 square meters per gram. It is quite unexpected that by only doubling the surface area of the carbon black, inoperative results are obtained. However, the pH of conductive channel black is shown by G. S. Whitby to be 4.6 or acidic, which further eliminates this type of carbon black for use in the adhesives of the invention.

The amount of carbon black used in the tread cement of the invention is preferably 50 to 75 parts per 100 parts by weight of rubber hydrocarbons, although ranges from 30 to 120, advantageously from 40 to 110, parts may be used. The general range of carbon black employed in the adhesive of the invention is 45 to 80 parts, per 100 parts by weight of rubber hydrocarbons.

The adhesive of the present invention, which surprisingly is self-adhering in nature, contains, per 100 parts of total rubber hydrocarbons, at least 65 and preferably at least 70 parts by weight of a tackifying resin, such as a resin comprising at least one condensation product of a member of the acetylene series and a phenol substituted in the ortho or preferably in the para position with an aliphatic hydrocarbon group having 1 to 10, advantageously 2 to 8, and preferably 3 to 6 carbon atoms. A typical tackifying resin is advantageously "Koresin" (a condensation product of acetylene and p-tertiary butyl phenol) or other resinous condensation products of acetylene compounds and phenols substituted in the para position with an alkyl group having 3 to 6 or 8 carbon atoms.

In general, such resins necessarily comprise at least a major proportion, preferably about 75 to 100% by weight of total resins and even more especially about 85 or 95 to 100% by weight of total resins, of condensation products of $C_2$ to $C_{12}$, advantageously $C_2$ to $C_8$, generally $C_2$ to $C_6$ alkines (preferably allylene and/or even more especially, acetylene) with certain phenols. The phenols must be substituted with a $C_1$ to $C_{10}$, advantageously a $C_3$ to $C_8$, preferably a $C_3$ to $C_6$ alkyl radical (especially a tertiary alkyl radical) in either the ortho or especially in the para position thereof.

Approximately half (e.g., 30 to 70%) of the above resin preferably is blended first with the cold SBR-type rubber in the substantial absence of solvents at a temperature at least sufficient to soften or melt the resin, the remainder of the resin being added in solution form and/or to a solution of the compounded cold rubber at a later stage in manufacturing the tread cement. Inasmuch as such resins melt at between 230° and 265° F., as disclosed in German Patents 422,904 and 523,993 and French Patent 758,042 to the I. G. Farben Co., an advantageous temperature range for mixing the first half, or say the first 20 to 80% of the above-defined resin, depending upon the melting point of the resin, is about 230° to 350° F., preferably about 250° to 330° F., and even more especially, about 270° to 320° F.

According to the German patents just mentioned, the resins which have now been found to be suitable for use in the tread cement of the present invention may be produced at reaction temperatures of between about 100° and 300° C. at atmospheric pressure, although pressures of 5 to 10 atmospheres under nitrogen are preferred. The acetylene material is caused to react with the modified phenol to produce the desirable resin by means of catalysts such a combination of sulfuric acid and mercuric sulfate, sulfuric acid-mercuric sulfate-ferric chloride, or mercuric oxide sulfuric acid, preferably impregnated on a carrier or support such as Kieselguhr, activated charcoal, etc. Alternatively, the reaction may be promoted by such catalysts as zinc and/or cadmium salts of acetic acid or other relatively low molecular weight monocarboxylic acids, with or without the addition of a minor proportion of sulfuric acid. The resin obtained melts at the above temperature of 230° to 265° F. and has been found to be highly useful for the purposes of the invention.

To produce the resin condensation products of ortho substituted or preferably para substituted alkyl phenols with acetylene compounds for use in the present invention, such as condensation products of $C_2$ to $C_{10}$ alkines with the substituted phenols hereinbefore described, it is also advantageous to use, for example, catalysts comprising at least one Group IIb metal, Group IIb metal oxide, Group IIb metal nitrate, and/or Group IIb metal $C_2$ to $C_{10}$ monocarboxylate such as zinc, cadmium and/or especially mercury used per se or in compound-form. Also, Groups IIIa, IVb, VIb, and/or especially Group VIII metal catalysts, optionally supported on refractory materials of high surface area such as, for example, eta-alumina, bentonite, activated charcoal, etc., are generally operative in many instances for promoting such condensation polymerization reactions. It is, however, desirable to use at least a minor proportion of the Group IIb metals or Group IIb metal compounds together with such latter metal catalysts. Best results are obtained when polymerization takes place at an elevated temperature of at least about 80° C. under a pressure generally approximating at least about 1.5 atmosphere absolute or higher.

The polymerization reactants to produce the substituted phenol-alkine resins, include as alkines, such monomeric materials as dimethyl acetylene, hexyl acetylene, methyl-allylene, allylene, and/or preferably acetylene. The hydrocarbon substituted phenols useful as polymerizable comonomers advantageously contain a $C_3$ to $C_{10}$ alkyl group, preferably a $C_3$ to $C_6$ tertiaryalkyl group, and may, for example, comprise such compounds as para-tertiary-butyl phenol, orthotertiary pentylphenol, para-tertiary amylphenol, para-propylphenol, para-isopropylphenol, para-hexylphenol, etc. Such resins are normally soluble in various rubber solvents such as hexane, naphtha, mineral spirits, gasoline or rubbermaker's solvent, which may be used in the process of this invention. A non-polar solvent is preferred. The tackifying resins used in the cement compositions of this invention are compatible with the butadiene-styrene copolymer, or, in other words, comprise resins which are capable of being milled into the polymer to form a rubber composition which is homogeneous when vulcanized to the elastic state.

The cement composition of this invention, if desired, may optionally contain small amounts of plasticizer oils, as will be more fully described hereinafter. The plasticizer oils, if used in the adhesive composition of the invention, may be the same as those disclosed in columns 9 to 12 of U.S. 2,964,083. Such plasticizer oils include, among others, hydrocarbon mineral oils boiling above 450° F. and containing aromatic, naphthenic and paraffinic hydrocarbons. Such plasticizer oils generally are petroleum oils having strong solvent power, high boiling points and low vapor pressures. Typical plasticizer oils, which may be used alone or in admixture, include:

(a) Sundex 53, a dark aromatic and naphthenic hydrocarbon lubricating oil extract consisting of three-fourths aromatic hydrocarbons and one-fourth naphthenic hydrocarbons.

(b) Circosol 2HX, a light green viscous hydrocarbon liquid having a specific gravity of 0.95, a Saybolt viscosity at 100° F. of 200 seconds and at 210° F. of 83 seconds. Such oil contains 20% aromatic hydrocarbons, 39% naphthenic hydrocarbons and 41% paraffinic hydrocarbons. It has a pour point of 10° F., a flash point of 540° F., and an aniline point of 174° F.

(c) Philrich 5, a liquid containing 41% aromatic hydrocarbons, 20% naphthenic hydrocarbons and 39% paraffinic hydrocarbons. It is a blend of extract oils produced during solvent extraction of lubricating oils.

Various other compounding ingredients which are used in certain SBR stocks may be employed in the cement of this invention including "BLE," "Santocure," "Santoflex AW," etc. The antioxidant, "BLE," is a high temperature reaction product of diphenylamine and acetone, "Santocure" is N-cyclohexyl-2-benzothiazole sulfenamide, an accelerator, and "Santoflex AW" is 6-ethoxy-1,2-dihydro-2,2,4-trimethyl quinoline.

In performing a process of the present invention, the synthetic rubber hydrocarbons, the carbon black and various other compounding ingredients, such as zinc oxide and an antioxidant, are added to a Banbury after substantial amounts of the tackifying resin have been incorporated into the rubber. Thus, 100 parts by weight of a diene rubber polymer having a computed Mooney viscosity of from 120 to 180 are added to the Banbury. The aforementioned amounts of alkylphenol-alkine resinous condensation products, such as Koresin or the like are then added. After this has been thoroughly incorporated, from 40 to 110 parts of the carbon black, 0 to 15 parts of oil, and certain other compounding ingredients are also incorporated for best results.

When the compounding ingredients are incorporated into a rubber on a mill or Banbury degradation of the rubbery polymer necessarily occurs. In the practice of the present invention it is important that most of long molecular structure of the high Mooney (120 to 180 ML-4 at 212° F.) rubber be retained in the final cement. The degradation is kept at a minimum both by incorporation of a substantial part of the resin in the softened or melted state where it lubricates the molecules of polymer and allows a minimum mixing time and temperature, by subsequently adding substantial amounts of an organic solvent which dissolves both the resin as well as the high Mooney cold SBR-type rubber and/or by adding the remainder of the resin in dissolved form. At least 20 parts, and preferably at least 30 or 40 parts, of the resin per 100 parts by weight of rubber hydrocarbons, generally about one-third to two-thirds of the total amount of resins in the final cement composition, are dispersed at an elevated temperature in the rubber before substantial amounts, i.e. at least a major portion, of the carbon black are added to the rubber. The amounts of tackifying resins added before the carbon black are sufficient that the compounded Mooney viscosity of the rubber stock facilitates the subsequent dispersion of carbon black in the rubber by conventional mastication at 230° to 350° F., at which temperatures the resins melt. If, in accordance with prior art procedures, all of the resin is added at this stage, the stock will be sticky and too difficult to handle. Various other compounding ingredients may be added at this time, including 0 to 10, preferably 2 to 8 parts of zinc oxide, 0 to 2 parts of stearic acid, and 0 to 3 parts of an antioxidant per 100 parts by weight of rubber hydrocarbons.

The rubber then is cooled to around room temperature or at least to below 150° F., preferably by discharging it from the Banbury and allowing it to stand. Thereafter, the rubber composition may be mixed at temperatures not in excess of about 220° to 230° F. with curing agents, such as 1 to 3 parts of sulfur, 0.5 to 3 parts of accelerators and the like per 100 parts by weight of total rubber hydrocarbons. At this stage, the temperature preferably is maintained well below (preferably 30° to 50° F. below) the vulcanization temperature. Normally, the temperature is maintained at from room temperature up to a temperature of about 212° to 230° F. It has been found, however, that when using the tread cement compositions of the present invention, in many instances, the curing agents may be omitted, if desired. This composition then is dispersed in an organic solvent for the rubber, the balance of total resin then being added to provide a resin content of 65 to 125 (preferably 70 to 110) parts per 100 parts of rubber.

The amount of resin added to the resulting cement is at least 20 parts, advantageously at least 30 or 40 parts, per 100 of rubber, and is preferably one-third to two-thirds of total resin in the cement. Alternatively, 35% to 70 or 80% of the total resins may be added after the rubber is dissolved, such last resin portion preferably being dissolved in a solvent for the rubber before it is added to the cement.

Best results are obtained when the total rubber hydrocarbons have an average toughness such that a mixture consisting of 100 parts of such rubber hydrocarbons, 44 parts of hydrocarbon mineral oil, and 72 parts of HAF carbon black has a compounded Mooney viscosity of about 60 to 95, preferably about 60 to 80.

The adhesive of this invention preferably is used with conventional SBR rubber treat compositions to make pneumatic rubber tires by what is known as the "flat-band" process. The multiple-ply fabric tire carcass is formed on a cylindrical tire building drum, and the ends of the fabric are turned over the wire bead rings to complete the carcass. Then, an extruded rubber tread stock, preferably formed of a high Mooney SBR rubber composition, is wrapped around the carcass on the drum and adhered to the carcass.

Before the tread stock is applied to the carcass, the self-adhering cement composition is applied to both the bias-cut ends of the tread stock and, if desired, to the entire bottom surface of the tread stock and such cement is allowed to dry. Then the tread stock is applied to the carcass and spliced in the usual manner.

The "green" tire then is removed from the tire building drum and placed in a conventional mold or press where it is expanded from generally cylindrical shape to a generally toroidal form. The means for shaping the tire and the curing conditions are conventional. The adhesive layer between the ends of the tread stock at the tread splice is sufficiently strong to hold the tire together during this radical expansion and during curing of the tire in the mold. When the tire so formed is vulcanized in such tire curing equipment and road tested at high speeds, no tread splice opening or tread separation of the tire so produced occurs.

The measurement of the viscosity or plasticity of the high Mooney SBR-type rubber used in the cement composition of the present invention is described in the "United States Government Specifications for Synthetic Rubber," July 1945, and "ASTM Standards on Rubber Products," December 1952, pages 488 to 491. The viscosity test using the Mooney plastometer has been given ASTM designation D-924-52T. The term "Mooney viscosity" as used in the present specification and claims designates the conventional reading on a Mooney plastometer using a large rotor at 4 minutes and a temperature of 212° F. The Mooney viscosity of a polymer is, of course, greater than that of a composition containing said polymer and a softener or tackifier.

The characteristics of different types of rubber polymers, such as polybutadiene and gel-containing SBR rubber polymers, cannot always be properly determined directly on a Mooney viscometer; and, therefore, it is customary to evaluate different rubbers after mixing them with predetermined amounts of oil and carbon black. Since the readings obtained on the Mooney plastometer provide a good indication of the properties of standard gel-free SBR (butadiene-styrene) rubber polymers, such polymers provide a basis for comparison using the concept of "computed Mooney viscosity" which is explained, for example, in U.S. Patent No. 2,964,083 and in the article appearing on pages 309 to 319 of India Rubber World, vol. 124, No. 3, June, 1951. The "computed Mooney viscosity" of any rubber polymer may be considered as the equivalent of the actual (measured) Mooney viscosity of a comparable gel-free polymer.

Since 100 parts by weight of a 90-Mooney gel-free SBR rubber polymer mixed with 30 parts of hydrocarbon mineral oil, and 65 parts of HAF carbon black produces a rubber mixture with a compounded Mooney viscosity (ML-4) of approximately 60, any other rubber polymer, which when mixed with such oil, and carbon black in the same proportions produces a rubber mixture with the same compounded Mooney viscosity of 60, has a "computed Mooney viscosity" of approximately 90. In other words, the "computed Mooney viscosity" of any rubber is the actual Mooney viscosity of a standard gel-free polymer having equivalent compounding properties.

As pointed out in the aforementioned article in India Rubber World and in U.S. Patent No. 2,964,083, sample compositions made for the purpose of determining the computed Mooney viscosity of a rubber polymer contain an amount of high abrasion furnace carbon black (Philblack O) equal to one-half the combined weight of the polymer and oil (Sundex 53). A plot of the Mooney viscosity of a given crude polymer against parts of oil required to plasticize a polymer to a given compounded Mooney viscosity is linear, as explained in the aforesaid article, and provides the basis for determining the computed Mooney viscosity of any rubber. If a raw rubber polymer has a computed Mooney viscosity of 120, then a mixture consisting of 100 parts by weight of said polymer, 44 parts of oil, and 72 parts of HAF carbon black will have a compounded Mooney viscosity of about 60. If the raw rubber polymer has a computed Mooney viscosity of 140, then a mixture consisting of 100 parts by weight of said polymer, 54 parts of oil, and 77 parts of HAF carbon black will have a compounded Mooney viscosity of approximately 60. If a raw polymer has a computed Mooney viscosity of 160, then a mixture consisting of 100 parts by weight of said polymer, 64 parts of oil and 82 parts of HAF carbon black would have a compounded Mooney viscosity of about 60.

While the apparent raw Mooney viscosity of certain of the polybutadiene rubbers is in the order of 35 to 65, it is recognized that they must be compounded with large amounts of oil and carbon black and that the raw Mooney measurements do not accurately reflect the plasticity of the polymers. For example, the raw Mooney viscosity of the polybutadiene rubber "Diene-55" is 52. When 100 parts by weight of Diene-55 is compounded with 30 parts of Sundex 53 oil and 65 parts of the HAF carbon black "Philblack-O," the compounded Mooney, or the Mooney viscosity, of that compound is 70.

In contrast, the raw Mooney viscosity of the cold rubber SBR-1500 is also 52. However, when 100 parts by weight of SBR-1500 are compounded with 30 parts of Sundex 53 oil and 65 parts of the HAF carbon black Philblack O, the compounded Mooney viscosity is 50. It is, therefore, manifest that Diene-55 polybutadiene rubber requires much more oil and is a tougher rubber than is SBR-1500 rubber, even though the raw Mooney viscosity measurements are of the same order. It is for such reasons that, in the present specification and claims, the phrase "computed Mooney viscosity" is employed to characterize the polymer or polymers used.

The amount of polybutadiene rubber portion of the adhesive composition of the present invention is preferably the same as the amount employed in the tire tread. Restated, it is preferred that the tread and rubbery portion of the adhesive of the invention contain the same amount of polybutadiene rubber, if polybutadiene rubber is present in either the tread or the tread cement composition of the invention.

In practicing a highly preferred embodiment of the present invention, 30 to 50 parts per 100 parts by weight total rubber hydrocarbons of tackifying resins of the type described hereinbefore are Banburied at a temperature level sufficient that the resin melts, that is at between about 230° and 330° F., preferably between about 250° to 320° F., with the entire amount of rubber which may comprise say about 60 or 70 to 100 parts by weight of a cold SBR copolymer having a computed Mooney viscosity of between about 120 to 160 together with 0 to 40 parts, preferably about 0 to 30 or 40 parts by weight of cis-1,4-polybutadiene rubber having a computed Mooney viscosity of between about 50 to 170, preferably about 70 to 150, and even more especially, about 80 to 110. The mixing in the Banbury is normally for about 2 to 10 minutes. Seldom is a Banburying time required in excess of 12 or 15 minutes. It is preferred but not indispensable to include about an 0.5 to 24.0 hour rest period after this Banburying step.

The second step, in accordance with a highly preferred embodiment of the present invention, involves the addition, to the pre-Banburied admixture of about half of the resin and 100 parts by weight of cold rubber copolymer, of about 0 or 5 to 9.5 parts, advantageously about 2.5 to 9.5 parts, preferably about 3.5 to 9.5 parts of a plasticizer hydrocarbon oil boiling within the limits described before, about 2 to 20, preferably 3 to 15, and even more especially about 4 to 8 or 10 parts by weight of zinc oxide and about 30 to 125 or more, advantageously about 40 to 125, preferably between 40 to 110 and even more especially about 50 to 75 parts by weight of a furnace carbon black having a basic pH preferably of 7.5 to 10.0 and an average surface area of about 100 to 150 square meters per gram.

The temperature during the second step, in accordance with this highly preferred embodiment of the invention, is maintained at between about 310° and 350° F., advantageously between about 315° and 340° F., preferably between about 320° and 330° F., the Banbury time being generally about 2 or 5 minutes up to generally no more than 30 or 45 minutes. If longer times are employed, heat build-up due to friction during mastication of the carbon black particles causes the Banbury temperature to rise above the temperature limits prescribed. For this reason, the type of carbon black is important, namely that the surface area be no greater than 170 or less than 100 square meters per gram, that the pH be basic, that the carbon black employed be a furnace carbon abrasion black. The conventional time for this second step is from about 4 to 8 minutes.

After adequate Banburying as above described, the compounded rubber stock formed is allowed to cool, preferably to room temperature, although temperatures not above about 150° to 230° F. are operative. If sulfur, accelerators and other curatives are to be added, the resulting blend should be Banburied but up to a temperature not in excess of about 230° F., advantageously 150° to 230° F., and preferably between about 180° to 225° F. for between about 0.2 and 15.0 minutes, the preferred time being about 0.5 and 5.0 minutes. It will be noted that the upper temperature limitation during the final Banburying and before subsequent dissolution of he adhesive to form a cement with subsequent addition of additional resin is about 230° F., which is approximately 35° to 45° (i.e., 40° F.) below the temperature at which the compounded rubber stock may be vulcanized at normal vulcanizing times if curing agents are added.

In this regard, vulcanization temperatures are generally between about 270° to 350° F., advantageously between about 275° to 335° F., and preferably between about 280° to 330° F. for a time of about 5 to 150 minutes, preferably about 15 to 60 minutes; the longer the curing time, the lower the vulcanization temperature and vice versa.

The last step in preparing the improved tread cement in accordance with a preferred embodiment of the present invention is the dissolution or dispersion of the cold rubber compounded stock. prepared as above, with the addition thereto of the remainder of the resin, preferably dissolved in the same or similar solvent. The solvent may be aromatic such as benzene or xylene or aliphatic such as hexane or may comprise other solvents such as hereinbefore described. The solvent will generally comprise organic hydrocarbons having boiling points of about 110° to 400° F., preferably about 150° to 380° F., and even more especially about 160° to 360° F. In general, of the 65 to 125 parts, preferably 65 to 90 parts, of resin added per 100 parts by weight of total rubber hydrocarbons, about 20 or 25 up to about 30 or 40 parts will have been added in the first Banburying step at a temperature above the melting point thereof. However, the use of as much as 50 or 60 parts of resin is considered to be within the scope of the invention, and, for certain acetylene-type alkylphenol condensation products, different amounts of resin may be used in melted form.

The invention is best illustrated by the following examples, wherein the percentages given are in parts by weight. It is to be understood, however, that the examples are given for purposes of illustration only and are not to be construed as limiting the present invention.

EXAMPLE I

Run A.—A tread cement composition is prepared using a gel-free butadiene-styrene copolymer polymerized at 5.0° C. and containing 72 weight percent butadiene and 28 weight percent styrene. The copolymer is found to have a computed Mooney viscosity of 130 (ML–4 at 212° F.), the following ultimate formulation being used:

Tread cement formulation

| | Parts by weight |
|---|---|
| SBR copolymer (cold rubber) | 100 |
| ISAF carbon black [1] | 60 |
| Acetylene-para-tertiarybutyl phenol resin | 74 |
| Zinc oxide | 5.0 |
| Phenyl-beta-naphthylamine (antioxidant) | 1.0 |
| Philrich 5 (oil) | 8.5 |
| N-cyclohexyl-2-benzothiazole sulfenamine (accelerator) | 1.2 |
| Diphenylquanidine (accelerator) | 0.3 |
| Sulfur | 2.2 |
| Total | 252.2 |

[1] ISAF carbon black having a surface area of 125 square meters per gram.

100 parts by weight of the aforedescribed high-Mooney SBR cold rubber polymer is Banburied with 34 parts of the resin with mastication at 275° F. to melt the resin and thereby disperse it in the rubber. After a 12 hour rest period, the 60 parts of ISAF carbon black are added to the rubber stock in the Banbury and thoroughly dispersed by mastication at 325° F. together with the zinc oxide, the oil, and the antioxidant. The rubber stock then is allowed to cool to room temperature, with subsequent addition after another 12 hour rest period of the curing agents including sulfur and accelerators. The compounded rubber stock is Banburied from room temperature up to a temperature of 220° F. i.e., approximately 50° below incipient vulcanization temperature.

The rubber composition formed is dissolved in gasoline-type rubbermaker's solvent (which is also a solvent for the resin), the 212.2 parts of the rubber composition being added to 1000 parts of the solvent. The balance of 40 parts by weight of the resin next is dissolved in 194.1 parts of the same solvent and added to the cement solution to form a total composition of 1446.3 parts by weight. The resulting tread cement composition is used in building a tire as more fully described hereinafter.

A tire is made by the flat-band process using an extruded tire tread of a composition made from a butadiene-styrene copolymer having a computed Mooney viscosity (ML–4) of 125 wherein 100 parts by weight of the copolymer is enriched with 40 parts of the hydrocarbon plasticizer Philrich 5. The bias-cut rubberized tire carcass fabric, also containing the cold rubber SBR 125 Mooney copolymer, is applied to a cylindrical tire building drum to form a two- (or four-)ply carcass on the drum. The above tread cement solution next is applied to the bias cut ends of the extruded tire tread as well as to the bottom of the tread stock, the solvent then being evaporated. After drying at room temperature, the coated tread stock formed is applied to the carcass on the tire building drum and the ends of the stock adhered to form a tread splice. The improved cement of the invention forms an adhesive layer at the tread splice and another layer joining the tread and carcass portions of the tire. The uncured tire containing the uncured cement then is removed from the building drum and placed in a "Bag-o-matic" press, where the tire is expanded by a curing bag from a generally cylindrical form to toroidal shape. The adhesive layers are found to hold the fabricated rubber portions of the tire firmly together during this extreme expansion of the tire.

Run B.—The same general procedure as in Example I, Run A is repeated except that an SBR polymer (72% butadiene-28% styrene) having a Mooney viscosity of only 80 is employed. A 35% drop in uncured tensile strength at the tread splice area is noted.

Run C.—The same general procedure as in Example I, Run A is repeated except that HAF carbon black having a surface area of 75 square meters per gram is substituted for the ISAF carbon black. The result is that the tread splice, during expansion, becomes deformed but does not completely separate.

Run D.—The same general procedure as in Example I, Run A is repeated except that SRF carbon black having a surface area of 17.5 square meters per gram is substituted for the ISAF carbon black. The result is that the tread splice, during expansion, becomes badly deformed in that the tread splice becomes partially separated.

Run E.—The same general procedure as in Example I, Run A is repeated substituting the resin 2,6-dimethylol-4-octyl phenol-formaldehyde (i.e., Amberol S.T.–137X) for the acetylene para-tertiarybutyl phenol resin. The result is that the tread splice separates when the uncured tire is expanded from cylindrical form to toroidal shape.

Run F.—The tires produced in accordance with Runs A, B, C and D are vulcanized by heating at 310° F. for 30 minutes, the tire of Run E not being tested because of complete tread splice separation. The resulting tires formed are also road tested at 75 miles per hour. It is noted that the tire produced in accordance with the present invention (Run A) exhibits a uniform tread splice area, has a tread splice tensile strength almost equal to that of the stock and gives a tread wear life of 46,000 miles.

However, although the tire produced in accordance with Run B using low Mooney rubber of 80 gives a similar tensile strength, tread splice opening occurs after 8,500 miles at 75 miles per hour. Run C gives a relatively poor splice compared to the tire of the invention produced in Run A. Also, in road service at 75 miles per hour, the tire of Run C is found to have partial tread splice separation at 18,000 miles, although complete tread separation does not occur. However, due to the tread splice separation problem, the life of the tire at 75 miles per hour is only 26,500 miles. In Run D, a tensile strength intermediate of Runs C and A is noted, the road service at 75 miles per hour resulting in complete tread splice separation at 19,500 miles.

In the above example, the tire may be made from tread and carcass compositions disclosed in U.S. Patent No. 2,964,083 or certain other compositions using the tread cement composition of this invention to improve the tire. If desired, the SBR rubber tread stock may include minor amounts of polybutadiene to improve tread wear.

EXAMPLE II

The same butadiene-styrene rubbery copolymer used in Example I is employed to make a tread cement composition utilizing the following ultimate formulation:

Tread cement formulation

| | Parts by weight |
|---|---|
| SBR Copolymer (cold rubber) | 75 |
| Polybutadiene (computed Mooney ML–4=85) [1] | 25 |
| ISAF carbon black | 60 |
| Acetylene-para-tertiarybutyl phenol resin | 74 |
| Zinc oxide | 5.0 |
| Diphenylamine-acetone reaction product (BLE antioxidant) | 1.0 |
| Philrich 5 (oil) | 8.5 |
| N-cyclohexyl-2-benzothiazole sulfenamide (accelerator) | 1.2 |
| Diphenylguanidine (accelerator) | 0.3 |
| Sulfur | 2.2 |
| Total | 252.2 |

[1] The polybutadiene contains 95% cis-1,4-polybutadiene and is produced by solution polymerization using the Ziegler catalyst consisting of triethyl aluminum and titanium tetrachloride.

Run A.—100 parts by weight of the high-Mooney SBR cold rubber polymer is Banburied at 275° F. with 34 parts by weight of the resin. Then, the 60 parts by weight of ISAF carbon black are added to the Banbury and thoroughly dispersed by mastication at 325° F. with the subsequent addition at the same temperature of 5 parts zinc oxide and 8.5 parts oil. The compounded stock is then cooled to below 150° F., with the addition of the antioxidant, as well as the accelerators, the sulfur, and then Banburied up to temperature of 230° F., i.e., approximately 40° below incipient vulcanization temperature.

The remaining 40 parts of the resin next are added dissolved in 446.3 parts of rubbermaker's solvent, with 1,000 parts of solvent being added to the cement such that there is a total solvent content of 1446.3 parts per 100 parts by weight of total rubber hydrocarbons. The procedure used to build the tire containing an oil-enriched cold rubber tread is essentially the same as in Example I and the adhesive layers are found to hold together as the tire is expanded from substantially cylindrical form to toroidal shape.

Run B.— The same general procedure as in Example II, Run A is repeated except that an SBR copolymer of 72% butadiene and 28% styrene having a Mooney viscosity of only 70 is employed. A 60% drop in uncured tensile strength at the tread splice area is noted.

Run C.—The same general procedure as in Example II, Run A is repeated except that HAF carbon black having a surface area of 70 square meters per gram is substituted for the ISAF carbon black. The result is that the tread splice, during expansion, becomes deformed but does not completely separate.

Run D.—The same procedure as in Example II, Run A is repeated except that SRF carbon black having a surface area of 19.5 square meters per gram is substituted for the ISAF carbon black. The result is that the tread splice, during expansion, becomes badly deformed and that the tread splice becomes partially separated.

Run E.—The same procedure as in Example II, Run A is repeated substituting the modified rosin Pentalyn-X (Pentaerythritol ester of rosin containing 85% abietic acid) for the acetylene-para-tertiarybutyl phenol resin. The result is that the tread splice separates when the uncured tire is expanded from cylindrical shape to toroidal form.

Run F.—The tires produced in accordance with Runs A, B, C and D are vulcanized by heating for 60 minutes at 287° F., the tire of Run E not being tested because of the complete tread splice separation. The resulting tires also are road tested at 75 miles per hour.

It is noted that the tire produced in accordance with the present invention (Run A) exhibits a uniform tread splice area, has an excellent tread splice tensile strength and gives a tread wear of 53,000 miles. However, the tire produced in accordance with Run B using a low Mooney rubber of 70 gives a deficient splice strength with tread splice opening after 7,000 miles at 75 miles per hour. In Run C, splice strength similar to that obtained in Run C of Example I is noted and in road service at 75 miles per hour, the tire is found to have a partial tread splice separation at 12,500 miles, although complete tread separation does not occur. However, due to the tread splice problem, the life of the tire at 75 miles per hour is only 28,000 miles. The result in Run D is that the splice strength is poor, the road service at 75 miles per hour resulting in complete tread splice separation at 19,000 miles.

EXAMPLE III

The same butadiene-styrene rubbery copolymer used in Example I is employed to make a tread cement composition utilizing the following ultimate formulation:

Tread cement formulation

| | Parts by weight |
|---|---|
| SBR Copolymer (cold rubber) | 75 |
| Polybutadiene (computed Mooney w/ ML–4=85) [1] | 25 |
| ISAF carbon black | 60 |
| Acetylenepara-tertiarybutyl phenol resin | 74 |
| Zinc oxide | 5.0 |
| Diphenylamine-acetone reaction product (BLE antioxidant) | 1.0 |
| Philrich 5 (oil) | 8.5 |
| N-cyclohexyl-2-benzothiazole sulfenamide (accelerator) | 1.2 |
| Diphenylguanidine (accelerator) | 0.3 |
| Sulfur | 2.2 |
| Pine oil | 1.5 |
| Total | 253.7 |

[1] See footnote 1, Example II.

Run A.—The same general procedure is used to make the rubber cement as in Example I, Run A, 100 parts by weight of the high Mooney SBR cold rubber polymer are Banburied at 275° F., with 34 parts by weight of the resin. Then, after a 12 hour rest period, the 60 parts by weight of ISAF carbon black are added to the Banbury and thoroughly dispersed at 325° F. together with the zinc oxide, the oil, and the antioxidant. The rubber stock is again given a 12 hour rest period and then Banburied from room temperature up to a temperature of 220° F., i.e., approximately 50° below incipient vulcanization temperature, with the sulfur and the accelerators being added initially.

As in Example II, 40 parts of the resin are added in dissolved form to the cement solution such that there is a total solvent content of 1446.3 parts per 100 parts by weight of total rubber hydrocarbons, the procedure used to build the tire containing the oil-extended cold rubber tread being essentially the same as in Example I.

The adhesive layers are found to hold together as the tire is expanded from substantially cylindrical form to toroidal shape.

Run B.—The same general procedure is repeated as in Example III, Run A is repeated except that 60 parts by weight of HAF carbon black having a surface area of 80 square meters per gram is substituted for the ISAF carbon black. The result is that the tread splice, during expansion, becomes deformed but does not completely separate.

Run C.—The same general procedure as in Example III, Run A is repeated except that all rubber hydrocarbons consist of the cold rubber butadiene-styrene copolymer with 50 parts of HAF carbon black being employed with the same result as in Run B.

Run D.—The same general procedure as in Example III, Run A is repeated except that no added polybutadiene rubber is employed (i.e., the amount of butadiene-styrene copolymer used is 100 parts by weight), the resin employed being 2,6-dimethylol-4-octyl phenol-formaldahyde resin (i.e., Amberol S.T.–137X). The result is that the tread splice separates when the uncured tire is expanded from cylindrical form to toroidal shape.

Run E.—The same procedure as in Example III, Run A is repeated substituting all polybutadiene rubber for the cold SBR rubbery copolymer, and with the omission of the resin. The result is that the tread splice separates when the uncured tire is expanded from cylindrical form to toroidal shape.

Run F.—The same general procedure as in Example III, Run A is repeated except that no sulfur or accelerators are added.

No tread splice deformation during expansion is noted and the tire formed after curing for 30 minutes at 310° F. and after road testing at 75 miles per hour exhibits a tread wear of 41,000 miles and has a tread splice tensile strength almost equal to that of the stock. It is found, therefore, that the omission of the curatives only slightly reduces the efficiency of the tire during manufacture and during road testing.

Run G.—The same general procedure as in Example III, Run F is repeated but the resulting toroidal shaped tire is vulcanized at 287° F. for 70 minutes. During manufacture, no tread splice deformation or tread splice separation is encountered and the tread splice tensile strength is found to be almost equal to that of the stock with a tread wear at 75 miles per hour after vulcanization of 40,000 miles. This shows that the vulcanization conditions may be varied when practicing the present invention.

Run H.—The same general procedure as in Example III, Run F is repeated except that all SBR high Mooney GRS copolymer is utilized with the polybutadiene rubber being omitted. No deformation at the tread splice area or tread splice separation is encountered during expansion from cylindrical to toroidal form and the resulting tire, vulcanized at 310° F. for 30 minutes, is found to exhibit a tensile strength at the tread splice area about equal to that of the stock and to have a tread wear life at 75 miles per hour of 40,500 miles. This shows that the inclusion of a minor proportion of polybutadiene rubber is optional. However, when practicing the present invention, it is generally preferred to include a minor proportion of the polybutadiene rubber principally to lower heat build-up, i.e., heat generation.

In the above example, the SBR rubber copolymer used in the cement may be replaced with an SBR polymer corresponding to that of an SBR-1712 masterbatch but free of oil. SBR-1712, a well-known oil-rubber masterbatch (cold rubber), is a mixture of 100 parts by weight of a copolymer of butadiene and styrene and 37.5 parts of a highly aromatic processing oil (i.e., Philrich 5). The polymer is manufactured by emulsion polymerization at about 5° C., using mixed soaps of rosin and fatty acids, a sugar-free iron activated system, and a carbamate shortstop. SBR-1712 may be coagulated by the salt-acid procedure, the butadiene-styrene copolymer containing about 22.5 to 24.5 percent of styrene.

EXPERIMENT I (COMPARATIVE)

Run A.—An oil-extended rubber tread compound is prepared from a substantially gel-free, butadiene-styrene copolymer polymerized at 41° F. and containing 72 percent by weight of butadiene and 28 percent by weight of styrene and having a Mooney viscosity (ML-4) of 150 using the following recipe:

Oil-extended SBR tread recipe

| | Parts |
|---|---|
| 150 ML-4 Polymer (SBR cold rubber) | 100 |
| Petroleum softener (Sundex 53) | 50 |
| HAF carbon black (Philblack O) | 75 |
| Zinc oxide | 5 |
| Stearic acid | 2 |
| Sulfur | 2.2 |
| Santocure (N-cyclohexyl-2-benzothiazole disulfenamide) | 1.2 |
| DPG (diphenyl guanidine) | 0.2 |

The above materials are compounded and mixed under the usual two-pass Banbury mixing procedure and extruded into suitable tread form.

A tread cement compound is prepared from the same copolymer using the following recipe:

SBR tread adhesive recipe for tread cement

| | Parts |
|---|---|
| 150 ML-4 Polymer (SBR cold rubber) | 100 |
| Koresin (acetylene-para-tertiarybutyl phenol resin) | 40 |
| Petroleum softener (Sundex 53) oil | 10 |
| HAF carbon black (Philblack); 74.2 sq. meters per gram) | 60 |
| Zinc oxide | 5 |
| Sulfur | 2.2 |

SBR tread adhesive recipe for tread cement—Continued

| | Parts |
|---|---|
| BLE (diphenylamine-acetone reaction product) | 1.0 |
| Santocure (N-cyclohexyl-2-benzothiazole disulfenamide) | 1.2 |
| DPG (diphenyl guanidine) | 0.3 |

One-hundred parts of the above tread cement compound are dispersed, after the usual appropriate mixing on a mill, in 900 parts of solvent petroleum naphthato form a tread cement.

The same copolymer is also used to prepare a carcass compound using the following recipe:

Oil-extended SBR carcass recipe

| | Parts |
|---|---|
| 150 ML-4 Polymer (GR-S cold rubber) | 100 |
| Petroleum softener (Sundex 53) oil | 50 |
| FEF carbon black (Philblack A) | 65 |
| Zinc oxide | 5 |
| Stearic acid | 2 |
| Sulfur | 2.2 |
| Santocure (N-cyclohexyl-2-benzothiazole disulfenamide) | 1.2 |
| DPG (diphenyl guanidine) | 0.2 |

After the cement and the compounded tread and carcass stocks have been prepared, they are used in the conventional manner to build a tire, the carcass compound being calendered on to a tire cord fabric (which has previously been treated or dipped as in Mighten Patent No. 2,561,215 with a compounded vinyl pyridine-butadiene copolymer latex) to form an all-synthetic rubber tire with the tread compound being formed in the regular cylindrical shape and then expanded to toroidal form. The ply fabric is coated on both sides with the above cement solution by suitable means and is cut on the bias for use in forming tire plies. These plies are used in the customary way to form a tire carcass on the drum of a tire-building machine. The tread cement is then applied at the tread splice and to the underside of the tread stock which has been extruded. After drying, the coated tread is applied to the carcass. The dried cement or adhesive forms a layer at the tread splice area and between the tread and the carcass portions of the tire. The tire then is shaped and vulcanized in the usual manner (e.g. at 287° F. for 60 minutes) in a suitable tire mold.

A tire produced in this way is very durable and will last for a long period of time without separation of the tread from the carcass. Such a tire having the oil-extended tread adhered at the splice and to the carcass as above will last 30,000 miles under severe conditions of use at 75 miles per hour without failure.

Run B.—The same general procedure as in Experiment I, Run A is repeated except that an SBR copolymer (72 percent butadiene–28 percent styrene) having a Mooney viscosity of only 80 is employed. A 30 percent drop in uncured tensile strength at the tread splice area is noted.

Run C.—The same general procedure as in Experiment 1, Run A is repeated except that SRF carbon black having a surface area of only 17.5 square meters per gram is substituted for the HAF carbon black. The result is that the tread splice, during expansion, becomes partially separated.

Run D.—The same procedure as in Experiment I, Run A is repeated substituting the resin 2,6 - dimethylol-4-octyl phenol formaldehyde (i.e., Amberol S.T.–137X for the acetylene-para-tertiarybutyl phenol resin (i.e., Koresin). The result is that the tread splice separates when the uncured tire is expanded from the cylindrical form to toroidal shape.

Run E.—The tires produced in accordance with Runs A, B and C are vulcanized by heating at 287° F. for 60 minutes, the tire of Run D not being tested because of complete tread splice sepaartion. The resulting tires formed are also road tested at 75 miles per hour. It is noted that the tire produced in accordance with Experiment I, Run A, exhibits a uniform tread splice area, has a tread splice tensile strength almost equal to that of the stock and gives a tread wear life of 30,000 miles (supra).

The tire produced in accordance with Run B using a low Mooney rubber of 80 gives a very low splice strength, tread splice opening occurs after 7,500 miles at 75 miles per hour. In Run C, an intermediate splice strength is noted, the road service at 75 miles per hour resulting in complete tread splice separation at 18,000 miles.

EXPERIMENT II (COMPARATIVE)

Run A.—A standard SBR cold rubber tread compound is prepared from a substantially gel-free, butadiene-styrene copolymer polymerized at 41° F. and containing 72 percent by weight of butadiene and 28 percent by weight of styrene and having a Mooney viscosity (ML-4) of 50 using the following recipe:

Regular SBR tread recipe

| | Parts |
|---|---|
| 50 ML-4 Polymer (SBR cold rubber) | 100 |
| HAF carbon black (Philblack O) | 50 |
| Petroleum softener (Sundex 53) | 8.0 |
| Zinc oxide | 3.0 |
| Stearic acid | 1.0 |
| Sulfur | 1.75 |
| Santocure (N - cyclohexyl - 2 - benzothiazole sulfenamide) | 1.0 |

The above materials are compounded and mixed in a Banbury mixer according to the usual mixing procedure and are extruded into a suitable tread form.

The same SBR copolymer (50 ML-4) is used to prepare a rubber carcass compound using the following recipe:

SBR carcass recipe

| | Parts |
|---|---|
| 50 ML-4 Polymer (a cold GR-S rubber) | 100 |
| FEF carbon black (Philblack A) | 40 |
| Zinc oxide | 5.0 |
| Stearic acid | 1.0 |
| Petroleum softener (Sundex 53) | 12.0 |
| Sulfur | 1.8 |
| Altax | 1.5 |
| DPG (diphenyl guanidine) | 0.2 |

A substantially gel-free, butadiene-styrene copolymer polymerized at 41° F. and containing 72 percent butadiene and 28 percent styrene and having a Mooney viscosity of 145 (ML-4) is used to prepare a tread adhesive compound according to the following recipe:

SBR tread adhesive recipe for tread cement

| | Parts |
|---|---|
| 145 ML-4 Polymer (SBR cold rubber) | 100 |
| Koresin (acetylene-para-tertiarybutyl phenol resin) | 40 |
| HAF carbon black (Philblack O) | 60 |
| Zinc oxide | 5.0 |
| Sundex 53 | 10.0 |
| BLE (diphenylamine-acetone reaction product) antioxidant | 1.0 |
| Sulfur | 2.2 |
| Santocure (N-cyclohexyl-2-benzothiazole sulfenamide) | 1.2 |
| DPG (diphenyl guanidine) | 0.3 |

After appropriate mixing, 100 parts of the above tread adhesive compound are dispersed in 900 parts of petroleum solvent naphtha to form a cement solution. The extruded regular SBR tread stock in cut on a bias to the proper length for application to the SBR carcass and the underside of the tread stock is coated and dried with the tread cement of this experiment. The cement also is applied at the tread splice area and dried. The resulting coated tread stock is applied to the carcass in the conventional manner as described in comparative-Experiment I, Run A. The tire then is expanded to toroidal form in a tire mold and cured at 300° F. for 45 minutes.

The all-synthetic tire produced in the manner described in Comparative-Experiment II, Run A does not show any substantial tread separation after being operated for 30,000 miles or so at 75 miles per hour. Tests further show that all-synthetic SBR rubber tires made with these SBR tread cements are better than SBR rubber tires made with natural rubber tread cements.

Run B.—The same general procedure as in Experiment II, Run A is repeated except that an SBR copolymer of 72 percent butadiene and 28 percent styrene having a Mooney viscosity of only 70 is employed. A 55 percent drop in uncured tensile strength at the tread splice area is noted.

Run C.—The same procedure as in Experiment II, Run A is repeated except that SRF carbon black having a surface area of only 19.5 square meters per gram is substituted for the HAF carbon black. The result is that the tread splice, during expansion, becomes badly deformed and that the tread splice becomes partially separated.

Run D.—The same procedure as in Experiment II, Run A is repeated substituting the modified rosin Pentalyn–X (Pentaerythritol ester of rosin containing 85 percent abietic acid) for the acetylene-para-tertiarybutyl phenol resin. The result is that the tread splice separates when the uncured tire is expanded from cylindrical shape to toroidal form.

Run E.—The tires produced in accordance with Runs A, B and C are vulcanized by heating for 30 minutes at 310° F., the tire of Run D not being tested because of the complete tread splice separation. The resulting tires also are road tested at 75 miles per hour.

It is noted that the tire produced in accordance with Run A exhibits a uniform tread splice area, has a tread splice tensile strength almost equal to that of the stock and gives a tread wear of 33,500 miles. However, the tire produced in accordance with Run B using a low Mooney rubber of 70 gives a low splice strength, and tread splice opening occurs after 6,300 miles at 75 miles per hour. The result in Run C is that the splice strength is moderately high, the road service at 75 miles per hour resulting in complete tread splice separation at 13,200 miles.

Run F.—The same general procedure as in Experiment II, Run A is repeated except that no zinc oxide, sulfur or accelerators are added.

No tread splice deformation during expansion is noted and the tire formed after curing for 30 minutes at 310° F. and after road testing at 75 miles per hour exhibits a tread wear of 32,000 miles and has a tread splice tensile strength about equal to that of the stock. It is found, therefore, that the omission of the curatives only slightly reduces the efficiency of the tire during manufacture and during road testing.

Run G.—The same general procedure as in Experiment II, Run F is repeated but the resulting toroidal shaped tire is vulcanized at 280° F. for 90 minutes. During manufacture, no tread splice deformation or tread splice separation is encountered and the tread splice tensile strength is found to be almost equal to that of the stock with a tread wear at 75 miles per hour (after vulcanization) of 29,750 miles. This shows that the curing conditions may be varied.

EXAMPLE IV

The same general procedure as in Example I, Run A is repeated except that 34 parts by weight of the total resin first are dissolved in the xylene mixture "xylol" to form a 20% solution. This solution then is blended with the 8.5 parts by weight of Philrich 5 plasticizing oil and 73 parts by weight of water together with 0.35 part oleic acid and 0.35 part ammonium hydroxide. The resulting admixture is formed into a stable emulsion by agitation followed by 2 passes through a Charlotte-type colloid mill. This resin-emulsion then is blended with the SBR latex and coagulated by standard salt-acid technique to obtain a crumb which is dried, sheeted out, with the 100 parts by weight of SBR copolymer (ML–4) 130, the 34 parts of acetylene para-tertiarybutyl phenol rein, the 8.5 parts of oil being masticated at 275° F. with 40 more parts of the resin being added dissolved in a solvent as in Example I, Run A. The indicated amounts of ISAF carbon black, zinc oxide, and phenyl-beta-naphthylamine, sans additional oil, are masticated at 325° F. and the balance of Run A repeated exactly, with the following results: The resulting adhesive layers are found to hold the fabricated rubber portions of the tire together at the cement-coated tread splice area as the tire is expanded from cylindrical shape to toroidal form. Upon vulcanizing, as in Run F of Example I, the tread splice area is found to be uniform, the tensile strength being almost equal to that of the stock and the tread wear life of the resulting tire is 47,200 miles with no tread splice opening occurring during the entire road testing at 75 miles per hour.

In the appended claims, the terms "diene rubbery polymer" and "rubbery diene polymer" are used in a generic sense to include non-oil-resistant rubbery synthetic hydrocarbon polymers such as hydrocarbon copolymers (preferably emulsion copolymers) of a major proportion of one or more multiolefins such as butadiene, isoprene and dimethyl butadiene with a minor proportion of copolymerizable monoolefinic hydrocarbons such as one or more of those aforementioned.

Resort may be had to modifications and variations without departing from the spirit of the invention or the scope of the appended claims.

What is claimed is:

1. In a method for producing a self-adhering tread adhesive, the improvement which comprises blending with 100 parts by weight of a diene rubbery hydrocarbon polymer having a computed Mooney viscosity of about 120 to 180, about 65 to 125 parts of a resin comprising the condensation product of a $C_2$ to $C_{12}$ alkine and a phenol substituted in the para position with $C_3$ to $C_8$ alkyl group, and about 30 to 120 parts per 100 parts by weight of total rubber hydrocarbons of an abrasion furnace carbon black having a basic pH and an average surface area of about 100 to 170 square meters per gram, a first portion comprising about 30 to 70 by weight of said resin being incorporated into said adhesive in heat-softened form, the remaining resin portion then being incorporated into said adhesive in the presence of solvating amounts of an organic resin solvent, at least a major portion of said furnace carbon black being blended into said adhesive subsequent to said first portion of said resin but prior to the incorporation of said remaining resin portion.

2. In a process for preparing a tire tread cement composition using rubbery diene polymer having a computed Mooney viscosity of about 120 to 180, the steps which comprise masticating with 100 parts by weight of said polymer at a temperature of about 250° to 350° F. about 30 to 70 percent by weight of a total of 65 to 125 parts by weight of a resin which melts during said mastication, said resin being the condensation product of a $C_2$ to $C_{12}$ alkine and a phenol substituted in the para position with a $C_3$ to $C_8$ alkyl group, thereafter adding and masticating, at substantially said temperature, about 40 to 120 parts by weight of total rubber hydrocarbons of an abrasion furnace carbon black having a basic pH and an average surface area of about 100 to 170 square meters per gram, about 0 to 20 parts by weight of a hydrocarbon oil boiling above about 450° F. and about 0 to 10 parts by weight of zinc oxide, cooling the resulting blend to below about 225° F., adding 0 to 20 parts of compounding and curing agents thereto, subsequently re-cooling the composite formed to below about 150° F. and adding sufficient organic solvent that the composition contains about 15 to 85% by weight of said solvent, and subsequently blending in dissolved form the remainder of the resin.

3. In a method for preparing a tread cement adhesive, the improvement which comprises mixing an emulsion of a condensation product of acetylene and a phenol substituted in the para position with a $C_3$ to $C_8$ alkyl group with a synthetic rubber latex, the contained rubber of which has a computed Mooney viscosity of about 120 to 180 and comprises at least one rubbery diene polymer, there being in said mixture 100 parts by weight of rubber and 30 to 70 percent by weight of a resin to be employed in a total amount of 65 to 125 parts by weight, coagulating said mixture, drying said coagulum, adding thereto with mastication from 30 to 120 parts by weight of an abrasion furnace carbon black having a basic pH and an average surface area of about 100 to 150 square meters per gram at a temperature level of between about 250° to 330° F. and subsequently adding the remainder of the resin dissolved in a mutual solvent for the resin and the rubber.

4. In a process for making a tire tread adhesive composition, the improvement which comprises mixing 100 parts by weight of a rubbery synthetic hydrocarbon polymer having a computed Mooney viscosity of 120 to 180 and derived from a conjugated diolefin having about 4 to 8 crabon atoms with at least 20 parts by weight of a resin comprising the condensation product of an acetylene compound with a phenol substituted in the para position with an alkyl group having about 3 to 6 carbon atoms, thereafter adding about 50 to 110 parts by weight of an abrasion furnace carbon black having a basic pH and an average surface area of about 100 to 170 square meters per gram, said carbon black, said resin, and said rubbery synthetic hydrocarbon polymer being masticated at an elevated temperature, cooling the mixture thus masticated, thereafter dispersing curing agents in another mixing cycle and finally dissolving the rubber composition in a solvent which is a solvent for said resin with the addition of at least 20 more parts by weight of said resin to said cement such that the total resin content is beween about 65 to 110 parts by weight per 100 parts by weight of total rubber hydrocarbons.

5. A synthetic rubber tire with a tread portion comprising a rubbery diene polymer having an average computed Mooney viscosity of about 120 to 180 and having incorporated therein about 30 to 80 parts by weight per 100 parts by weight of total rubber hydrocarbons of a plasticizer boiling above about 450° F., said tread portion being secured to the tire carcass by means of an interposed bonding layer comprising an admixture of a rubbery diene polymer having a computed Mooney viscosity of between about 120 to 180, about 30 to 120 parts by weight of total rubber hydrocarbon of an abrasion furnace carbon black having a basic pH and an average surface area between about 100 to 170 square meters per gram, and about 65 to 125 parts by weight per 100 parts of rubbery diene polymer of a resin comprising the condensation product of a $C_2$ to $C_{10}$ alkine with a phenol compound containing a $C_3$ to $C_8$ alkyl radical in a position selected from the group consisting of ortho and para, said interposed bonding layer containing 0 to 30 weight percent based on total rubber hydrocarbons of polybutadiene rubber having at least about 60% cis-1,4-polybutadiene structure.

6. A tire in accordance with claim 5 in which the resin in the interposed bonding layer comprises the condensation product at an elevated temperature of an acetylene compound and a $C_3$ to $C_6$ alkyl para-substituted phenol, said resin having a melting point of about 230° to 265° C.

7. A composite structure comprising a first layer of an oil-enriched rubbery conjugated diene polymer having a computed Mooney viscosity in excess of 90, a second layer containing an oil-enriched rubbery conjugated diene polymer having an average computed Mooney viscosity in excess of 90, and an interposed layer of an adhesive composition comprising 100 parts by weight of a rubbery conjugated diene polymer having a Mooney viscosity of about 120 to 160, about 30 to 120 parts by weight per 100 parts of polymer of an abrasion furnace carbon black having a basic pH and an average surface area of about 100 to 170 square meters per gram, and about 65 to 110 parts by weight of a resin comprising the condensation product of a $C_2$ to $C_6$ alkine with an alkyl substituted phenol, said alkyl group having about 3 to 8 carbon atoms and being located at a position selected from the group consisting of ortho and para.

8. A tire having a tread comprising a cold-type diene rubber being enriched with about 30 to 80 parts by weight of a hydrocarbon plasticizer oil per 100 parts by weight of cold rubber, said tread being adhered to a carcass by means of a composition comprising a 15 to 85% solution in a solvent of a cold-type rubbery diene polymer having a computed Mooney viscosity of 120 to 180 and a resin melting at a temperature of about 230 to 265° F. and comprising the condensation product of a $C_2$ to $C_{12}$ alkine and a mono-substituted phenol, said substitution being a $C_1$ to $C_{10}$ alkyl group in a position selected from the group consisting of ortho and para, about 30 to 70% of said resin being incorporated therein in melted form, the remainder of said resin being added in dissolved form, the total amount of resin being about 65 to 125 parts by weight per 100 parts by weight of total rubber hydrocarbons, and about 40 to 100 parts by weight of an abrasion furnace carbon black having a basic pH and an average surface area of about 100 to 170 square meters per gram, said abrasion furnace carbon black having been added subsequent to said melted resin but prior to said dissolved resin.

9. A composite elastic structure comprising a layer of cold-type diene rubbery copolymer, a second layer of an oil-extended cold-type diene rubbery copolymer, and an interposed cement layer containing 100 parts by weight of a rubbery diene polymer having a computed Mooney viscosity of about 120 to 180, about 70 to 110 parts by weight of resin of acetylene and para-tertiarybutyl phenol, about 40 to 100 parts by weight of an abrasion furnace carbon black having a basic pH and an average surface area of about 100 to 150 square meters per gram.

10. In a process for splicing a synthetic rubber tire tread containing an oil-enriched cold-type diene copolymer, the improvement which comprises applying to the unspliced ends of the tread a cement composition comprising a solvent dispersion of 100 parts of a rubbery diene polymer having a computed Mooney viscosity of about 120 to 180, about 65 to 125 parts by weight of a resin comprising the condensation product of an acetylene compound and a phenol compound substituted in the para position with an alkyl group having from 3 to 8 carbon atoms, and about 30 to 120 parts by weight of an abrasion furnace carbon black having a basic pH and an average surface area of bout 100 to 170 square meters per gram, said cement composition being allowed to dry, said ends of the tread being brought together to form a splice, and thereafter distorting the tire from cylindrical shape to substantially torodial form, whereafter said tread and said splice are vulcanized together with the remainder of the synthetic rubber tire.

11. In a process for making a self-adhering tread adhesive containing 100 parts by weight of a synthetic rubber polymer of a $C_4$ to $C_6$ conjugated diolefin, said polymer having a computed Money viscosity of from 120 to 180, about 0 to 15 parts of a hydrocarbon plasticizer oil, about 70 to 110 parts of resins melting at a temperature of about 230° to 265° F. and comprising condensation products of a $C_2$ to $C_{12}$ alkine and a mono-substituted phenol, said substitution being a $C_1$ to $C_{10}$ alkyl group in a position selected from the group consisting of ortho and para, and about 50 to 110 parts of an abrasion furnace carbon black having a basic pH and an average surface area of about 100 to 160 square meters per gram, said rubber being of a toughness such that a mixture consisting of 100 parts of the rubber, 44 parts of mineral hydrocarbon oil and 72 parts of HAF carbon black has a compounded Mooney viscosity of about 60 to 95, the improvement which comprises masticating 100 parts of said rubber polymer together with any hydrocarbon plasticizer oil at a temperature above about 220° F. with about 35 to 55 parts of said resins, adding said carbon black and masticating the mixture formed at above about 220° F. to disperse said carbon black in said rubbery polymer and resins, cooling the resulting composition to below about 150° F., dissolving the rubber polymer and resins of said composition in an organic solvent to form a cement, and adding a solution containing about 35 to 55 additional parts of said resins to said cement to provide a total resin content of about 70 to 110 parts by weight.

12. Process according to claim 11 in which said resins subsequently added in solution are incorporated into said cement dissolved in a solvent which is also a solvent for said rubber of the cement.

13. In a flat-band method for making a pneumatic rubber tire in which a carcass is formed on a tire building drum and an extruded rubber tread stock is wrapped around and adhered to said carcass and spliced at its ends, the tire then being shaped and vulcanized, the improvement which comprises adding to 100 parts by weight of synthetic rubber polymerization products of a $C_4$ to $C_6$ conjugated diolefin, said products having a computed Mooney viscosity of from 120 to 180, about 0 to 15 parts of hydrocarbon plasticizer oil, a tackifying resin comprising the condensation product of acetylene and a $C_3$ to $C_8$ alkyl para-substituted phenol, and about 50 to 100 parts of an abrasion furnace carbon black having a basic pH and an average surface area of about 100 to 170 square meters per gram, about 20 to 40 parts of said resin being masticated with said rubber above about 200° F. and prior to adding said carbon black at said temperature, the amount of resin reducing the compounded Mooney viscosity of the composition to about 65 to 95, cooling said composition and dissolving the rubber of the composition in a solvent which also dissolves said resin, and adding at least about 20 more parts of resin so that the resulting cement contains from about 70 to about 110 parts of total resin per 100 parts by weight of total rubber, coating the end portions of said tread stock with said cement, allowing the cement to dry, uniting the coated tread end portions to form a splice which maintains a bond as the uncured tire is expanded from cylindrical to toroidal shape, said total rubber having an average toughness such that a mixture consisting of 100 parts by weight of said rubber, 44 parts of hydrocarbon mineral oil, and 72 parts of HAF carbon back has a compounded Mooney viscosity of about 60 to 85.

14. A toroidal-shaped pneumatic rubber tire having a carcass portion and a tread portion surrounding and adhered to said carcass portion, said tread portion having bias-cut ends which are adhered together by a self-adhering tread cement composition comprising 100 parts by weight of rubbery synthetic hydrocarbon polymerization products of conjugated diolefins having about 4 to 8 carbon atoms, said products having a computed Mooney viscosity of from 120 to 180, up to about 15 parts of hydrocarbon plasticizer oil, about 65 to 90 parts of a tackifying alkine-alkylphenol resin melting at a temperature of about 230° to 265° F. and comprising a condensation product of a $C_2$ to $C_{12}$ alkine and a mono-substituted phenol, said substitution being a $C_1$ to $C_{10}$ alkyl group in a position selected from the group consisting of ortho and para, and about 50 to 90 parts of an abrasion furnace carbon black having an basic pH and an average surface area of about 100 to 150 square meters per gram, about one-third to two-thirds of said resin having been added to said tread cement composition prior to the addition of said furnace carbon black, the balance of said resin being added in dissolved form after said carbon black.

15. A process for making a pneumatic tire adhesive which comprises adding to 100 parts by weight of synthetic hydrocarbon rubber polymerization products of conjugated diolefins having about 4 to 6 carbon atoms, said products having a computed Mooney viscosity of from 120 to 180, up to 15 parts of hydrocarbon plasticizer oil, about 70 to 95 parts of tackifying resins, about 50 to 100 parts of an abrasion furnace carbon black having a basic pH and an average surface area of about 100 to 170 square meters per gram, and about 1.5 to 6.0 parts of curing agents, at least 75 percent by weight of said tackifying resins being the condensation product of a $C_2$ to $C_8$ alkine and a phenol substituted in the para position with an alkyl group having about 3 to 6 carbon atoms, the rubber of said adhesive having an average toughness such that a mixture consisting of 100 parts by weight of said rubber, 44 parts of hydrocarbon mineral oil and 72 parts of HAF carbon black has a compounded Mooney viscosity of about 60 to 80, masticating said polymerization products with at least about 30 parts of said resins at an elevated temperature, thereafter adding said carbon black to the resulting mixture and masticating said mixture at said elevated temperature until a rubber composition having a compounded Mooney viscosity of about 60 to 95 is formed, cooling said rubber composition, dispersing said composition in a rubber solvent which is also a solvent for said resin, and thereafter adding the remainder of said tackifying resin so as to form a cement.

References Cited

UNITED STATES PATENTS

| | | | |
|---|---|---|---|
| 2,576,968 | 12/1951 | Pike et al. | 260—33.6 |
| 3,294,720 | 12/1966 | Beber et al. | 260—41.5 |

OTHER REFERENCES

"India Rubber World, Compounding Ingredients for Rubber," 2nd edition, 1947, p. 271.

Canadian Chemical Processing, "A Look at Carbon Black," pp. 81–84 and 91.

ALLAN LIEBERMAN, *Primary Examiner.*

U.S. Cl. X.R.

156—128; 260—33.6, 41.5, 879

UNITED STATES PATENT OFFICE
CERTIFICATE OF CORRECTION

Patent No. 3,421,565　　　　　　　　　　　　　　　　　　　　　　　　January 14, 1969

Emmett B. Reinbold

It is certified that error appears in the above identified patent and that said Letters Patent are hereby corrected as shown below:

Column 3, line 1, "adhesives" should read -- adhesives, --. Column 4, line 10, "April-June" should read -- April-June, --. Column 7, line 74, "treat" should read -- tread --. Column 10, line 36, "he" should read -- the --; line 52, "compounded." should read -- compounded, --. Column 14, line 7, "Acetylenepara-tertiarybutyl" should read -- Acetylene-para-tertiarybutyl --. Column 16, line 73, "sepaartion" should read -- separation --. Column 17, line 66, "in" should read -- is --. Column 19, line 2, "rein" should read -- resin - line 37, after "with" insert -- a --; line 42, "70" should read -- 70 percent -- Column 21, line 54, "bout" should read -- about --; line 58, "torodial" should read -- toroidal --. Column 22, line 70, "an", first occurrence, should read -- --.

(SEAL)　　　　　　Signed and sealed this 31st day of March 1970.

Attest:

Edward M. Fletcher, Jr.　　　　　　　　　　　　　　WILLIAM E. SCHUYLER, JR.
Attesting Officer　　　　　　　　　　　　　　　　　　Commissioner of Patents